A. A. BOWSER.
MEASURING PUMP.
APPLICATION FILED APR. 29, 1907.

1,088,201.

Patented Feb. 24, 1914.
5 SHEETS—SHEET 2.

Witnesses:
Ira D. Perry

Inventor:
A. A. Bowser
by Brown Hopkins
Attys

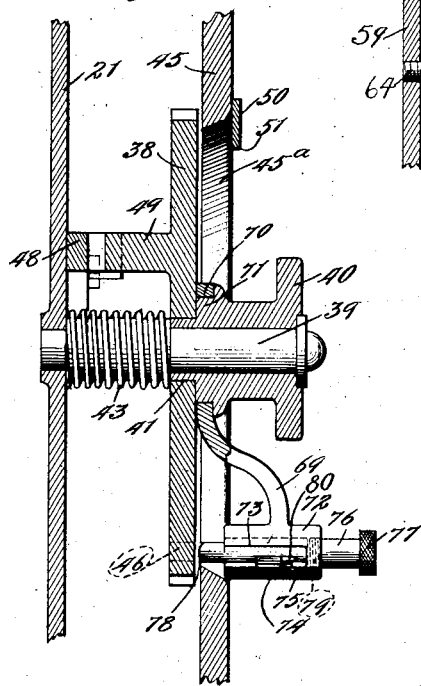

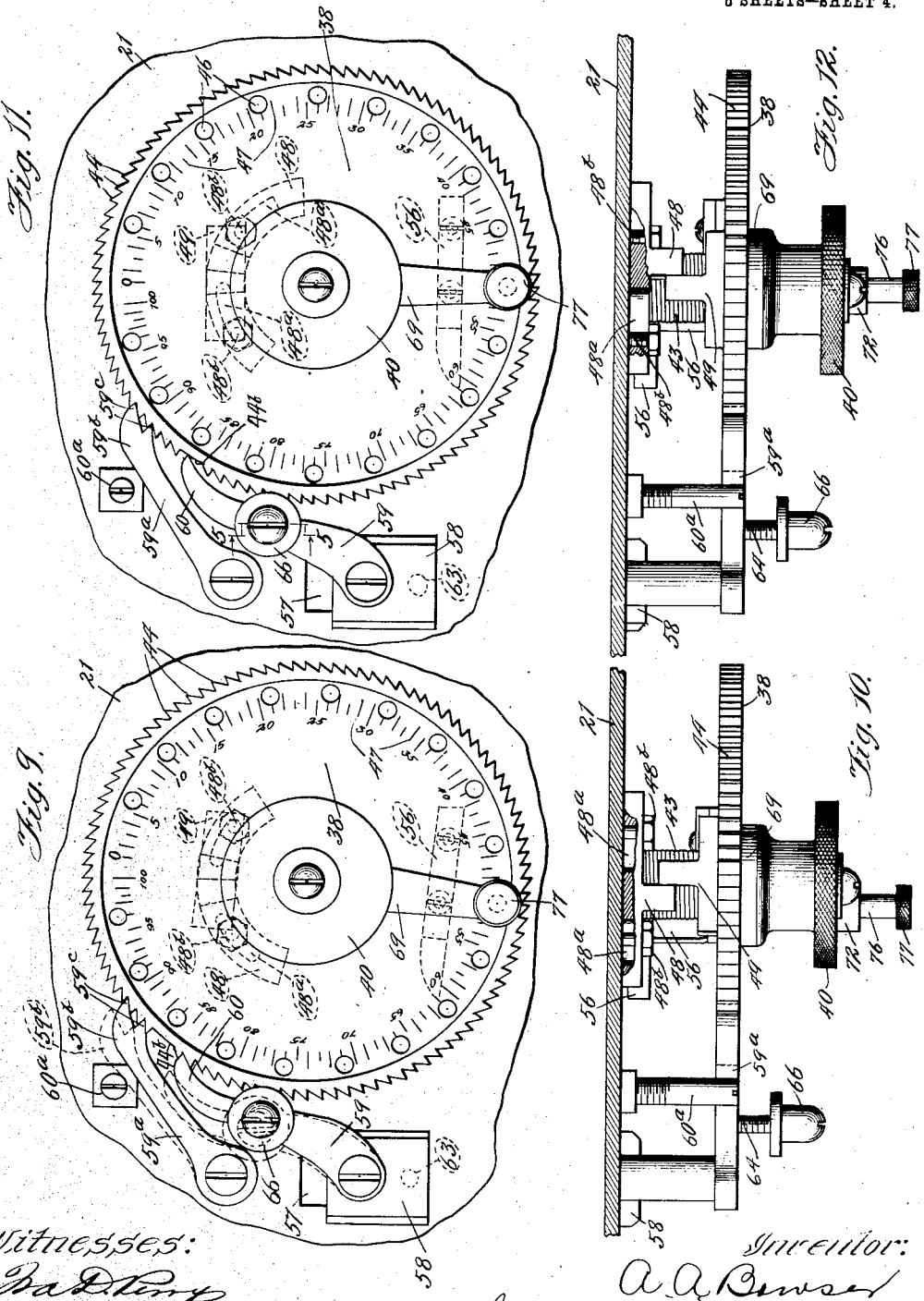

A. A. BOWSER.
MEASURING PUMP.
APPLICATION FILED APR. 29, 1907.

1,088,201. Patented Feb. 24, 1914.
5 SHEETS—SHEET 5.

Witnesses:
Inventor:
Allen A. Bowser
By Brown & Hopkins
Attys

UNITED STATES PATENT OFFICE.

ALLEN A. BOWSER, OF FORT WAYNE, INDIANA, ASSIGNOR TO S. F. BOWSER & COMPANY, INCORPORATED, OF FORT WAYNE, INDIANA, A CORPORATION OF INDIANA.

MEASURING-PUMP.

1,088,201.     Specification of Letters Patent.    Patented Feb. 24, 1914.

Application filed April 29, 1907. Serial No. 370,996.

*To all whom it may concern:*

Be it known that I, ALLEN A. BOWSER, a citizen of the United States, residing at Fort Wayne, in the county of Allen and State of Indiana, have invented certain new and useful Improvements in Measuring-Pumps, of which the following is a specification.

This invention relates to improvements in measuring pumps, and more particularly though not necessarily to the type of pump described in the application of H. M. Bowser and Allen A. Bowser, filed in the United States Patent Office on or about February 13, 1907, Serial No. 357,125, and which includes an improved indicator or dial, adapted to be set so that the pump will discharge a predetermined amount of liquid, and when the desired quantity has been discharged, the pump will be automatically checked or stopped; and the primary object of the invention is to provide improved means for returning or automatically resetting the dial to discharge or pump the same quantity after the first quantity has been pumped.

A further object is to provide improved means for limiting or checking the operative movement of the dial.

A further object is to provide an improved form of adjustable stop for the dial.

A further object is to provide an improved device of this character which will be simple, cheap and durable in construction, and effective and efficient in operation.

To the attainment of these ends and the accomplishment of other new and useful objects, as will appear, the invention consists in the features of novelty, in the construction, combination and arrangement of the several parts hereafter more fully described and claimed, and shown in the accompanying drawings illustrating an exemplification of the invention, and in which:—

Figure 1:
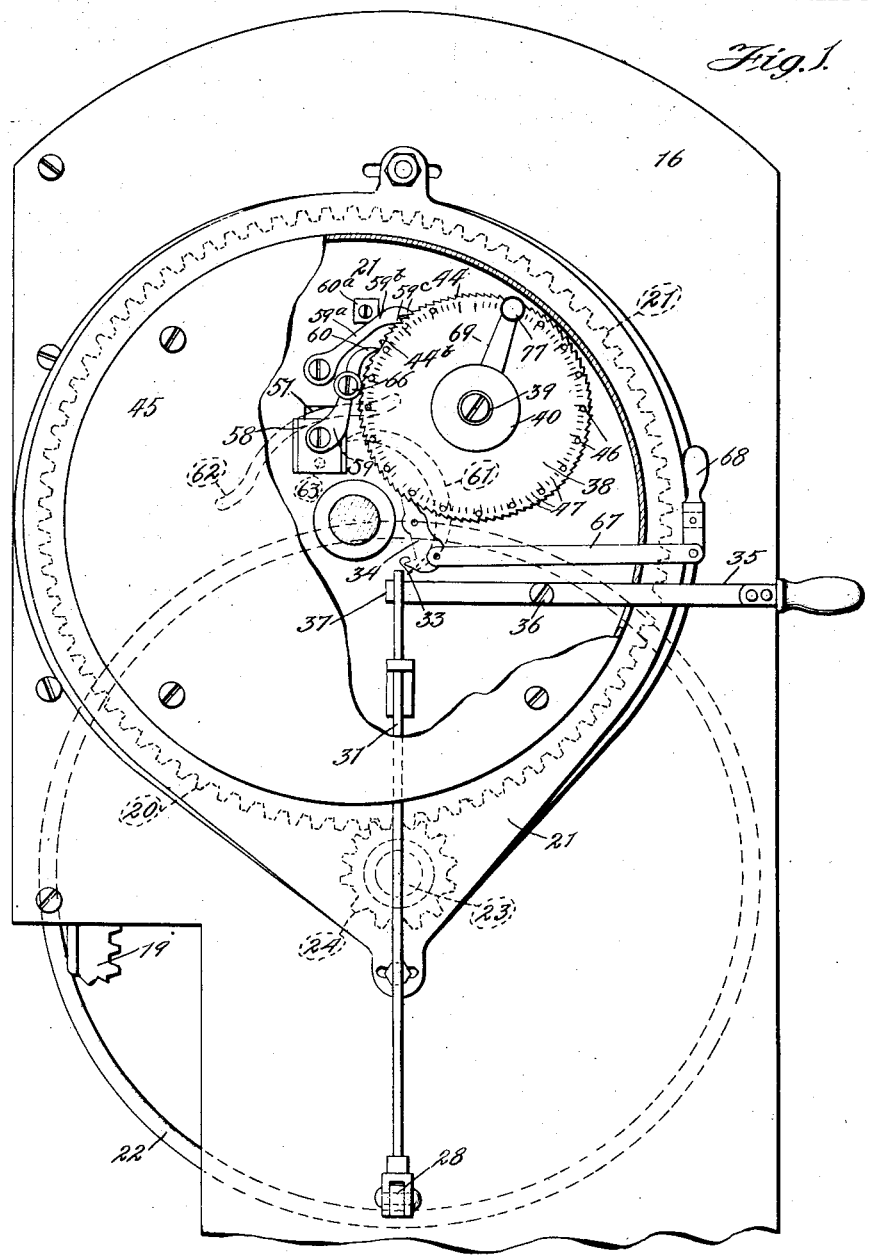
Figure 2:
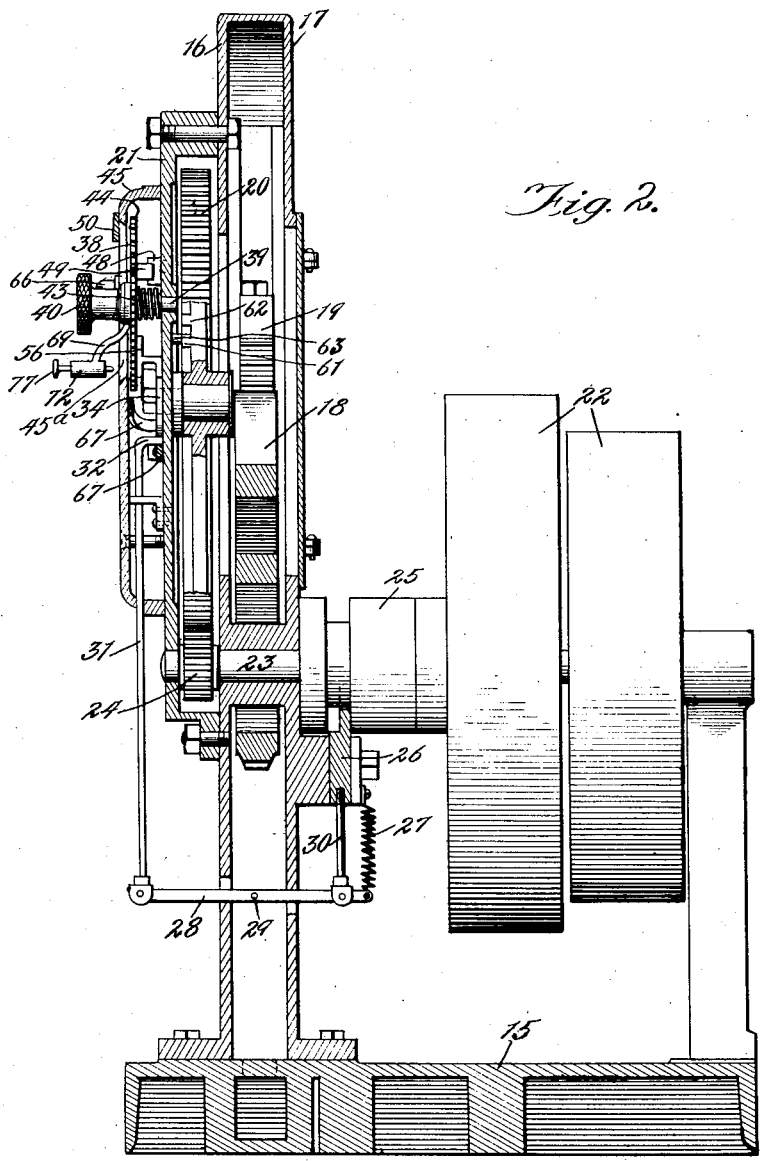
Figure 14:
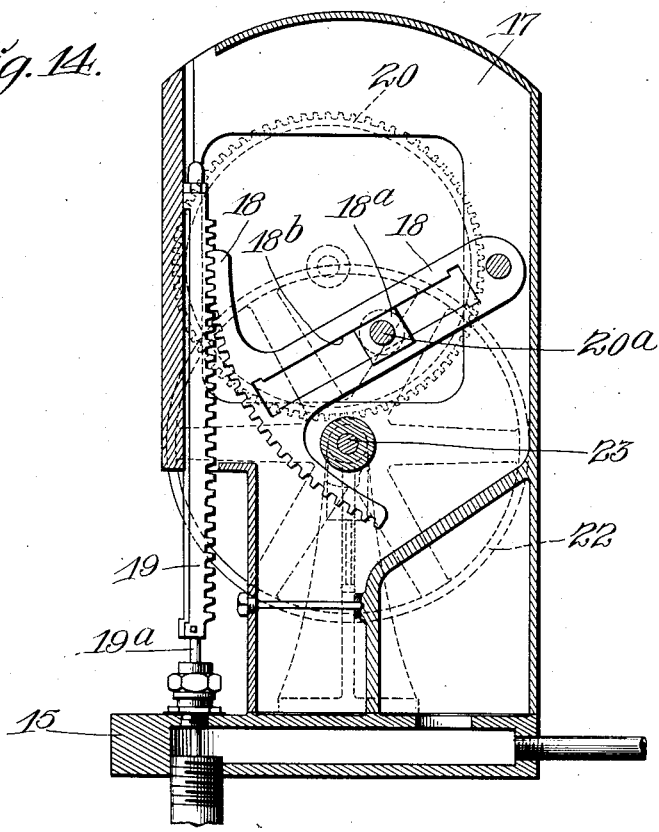
Figure 15:
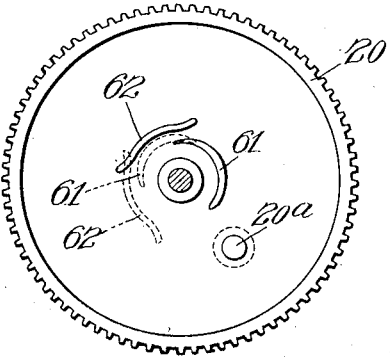

Figure 1 is a detail front elevation, partly broken away, of an improved apparatus of this class constructed in accordance with the principles of this invention. Fig. 2 is a longitudinal sectional view of Fig. 1. Fig. 3 is a detail sectional view on line 3—3 of Fig. 4. Fig. 4 is a front elevation of Fig. 3. Fig. 5 is a detail sectional view on line 5—5 of Fig. 11. Fig. 6 is a detail view of a portion of the dial and the operating pawl. Fig. 7 is a detail rear elevation of the dial, showing the manner of securing the operating handle to the dial. Fig. 8 is a detail perspective view of the latch or dog for locking the pump operating mechanism in operative position, and the arm or stop for tripping the latch or dog. Fig. 9 is a front elevation of the dial and the operating and retaining pawls showing their relative position when the dial is in a position that the pump will discharge the largest amount of liquid. Fig. 10 is a top plan view of Fig. 9. Fig. 11 is a view similar to Fig. 9 showing the dial in a zero position. Fig. 12 is a top plan view of Fig. 11. Fig. 13 is a view of the adjustable stop for the dial. Fig. 14 is a vertical sectional view of a portion of the structure showing the piston operating mechanism. Fig. 15 is a view of a detail.

Referring more particularly to the drawings, the same reference numerals designate similar parts throughout the views, and in this exemplification of the invention, the numeral 15 designates a suitable supporting base, upon which is mounted spaced walls 16—17, forming a segment casing, and pivotally mounted within this casing is a suitable toothed member 18, the teeth of which engage a suitable rack 19 which is operatively connected with the piston 19ª of the pump, so that when the member 18 is oscillated about its point of pivotal support the piston operating rack 19 will be reciprocated.

Motion is transmitted to the member 18 preferably by means of the gear 20, which is journaled to a suitable gear-casing 21, which latter is supported by the front face of the wall 16 of the segment casing. A suitable operative connection is arranged between the gear 20 and the member 18, and preferably comprises a crank pin 20ª on the gear 20, which pin enters a bearing member 18ª and which latter is adapted to slide in a slot 18ᵇ in the segment 18.

Motion is transmitted to the gear 20 preferably by means of pulleys 22 mounted upon a shaft 23, which extends through the segment casing; and secured for rotation with the shaft 23 is a pinion 24 which meshes with the gear 20, so that when motion is transmitted to the shaft 23, the gear 20 will be rotated by the pinion 24.

A suitable clutch mechanism 25 is arranged to control the rotation of the gear 20, and an operating member 26, which is normally held in position by means of a suitable yielding member, such as a spring 27, serves to lock or unlock the pulleys 22 from the shaft 23.

A lever is preferably pivoted between its ends, as at 29, and passes through the walls of the segment casing, one end of which is operatively connected to the clutch operating member 26, through the medium of the connection 30. The other end of the lever 28 is secured to a rod 31. This rod is extended upwardly in front of the gear casing 21, and the extremity 32 thereof is preferably bent or deflected, and said extremity is adapted to engage the free end 33 of the latch or dog 34, which is pivotally supported preferably by the front of the gear casing 21.

Any suitable means may be provided for raising the rod 31, so that the extremity 32 thereof will be brought into engagement with the dog 34. A suitable and efficient means for accomplishing this purpose comprises an operating lever 35, which is pivotally supported, as at 36, intermediate its ends, and preferably by the front of the gear casing 21. The free extremity 37 of this lever stands adjacent, and is adapted to engage the deflected or bent end 32 of the rod 31, and when the handle of the lever 35 is moved so as to elevate the extremity 37, the deflected end 32 of the bar 31 will be raised against the tension of the yielding member 27, and into a position to be engaged by the end 33 of the dog 34. This dog 34 being of the gravity type, will assume a position to permit the deflected end 32 to pass the end 33 on the upward movement of the rod 31, and after said end has passed the end 33 of the dog, the latter will assume its normal position, so that when the lever 35 is released the end 32 will rest upon the end 33 of the dog. This adjustment of the rod 31 will move the clutch operating member 26 out of operative position and permit the pulleys 22 to become locked to the shaft 23, so that the motion will be transmitted to the member 18 to operate the pump piston.

All of these parts however form the subject-matter of the application, Serial Number 357,125, above referred to.

An indicator dial 38 is rotatively mounted upon and spaced from the face of the casing 21, preferably by means of an axle 39. This indicator 38 is preferably provided with an operating handle 40 having a reduced portion 41, which is adapted to enter a suitable aperture in the indicator, terminating flush with the rear face thereof. The reduced portion 41 extends into the indicator from the front face thereof, and suitable screws or bolts 42 are seated in the rear face of the indicator in a position so that a portion of the edge thereof will extend over and engage the exposed face of the reduced portion 41. And said screws 42 serve as a means for preventing accidental displacement of the operating handle 40.

If desired, the periphery of this operating handle 40 may be milled or knurled for the purpose of permitting the easy operation of the dial. A flexible member, such as a coiled spring 43, or the like, is arranged around the axle 39, preferably between the face of the gear casing 21 and the rear face of the indicator 38. One extremity of the spring 43 is secured to the gear casing 21, and the other extremity is secured to the indicator 38, so that when the latter is rotated by means of the handle 40 a tension will be created upon said spring or member 43, which tends to return the indicator to its normal or initial position when the operating handle 40 is released.

The indicator is preferably provided with peripheral gear teeth, and is of such a diameter that when the indicator is in position and the cover or casing 45 is in place thereon, which latter is provided with a suitable aperture 45ª therein to expose the face of the indicator, the gear teeth 44 will assume a position behind, and be covered or protected by, the cover 45. Suitable apertures 46 are arranged in the indicator 38, preferably adjacent the periphery thereof, and coöperating with said aperture 46 are a series of graduations 47 which are arranged on the face of the indicator dial in such a manner as to progress successively around the dial from a zero point.

Projecting from and movably supported by the face of the gear casing 21 is a stop 48, shown more clearly in Fig. 13, which is adapted to be engaged and moved by a laterally projecting stop lug 49 arranged on the rear face of the indicator 38, and said stop 49 is adapted to engage and move the stop 48 when the indicator 38 is moving in a clock-wise direction to permit the latter to assume a zero position as shown in Fig. 11, and to be engaged and moved by the stop 49 when the indicator is moving in an anti-clock-wise direction, to permit the latter to assume a position as shown in Fig. 9 to pump 100 gallons, that is, so that the character indicating one hundred gallons will assume a position under the end 51 of the indicator 50. The stop 48 is provided with laterally projecting extremities, each of which is provided with a slot 48ª to permit the movement of the stop, the latter being held or supported by means of fastening devices 48ᵇ which pass loosely through the slots 48ª and engage the casing 21.

Pivotally supported, and preferably by the front of the cover 45 is a pointer 50, one extremity 51 of which projects over the face of the indicator 38, and is adapted to coöp- erate with the graduations 47 thereon. The other extremity 52 projects beyond its pivot point 53, and is adapted to engage a stop 54, which latter is also preferably arranged on the face of the casing or cover 45. The stop 54 permits the pointer 50 to move about its point of pivotal support in one direction, and prevents it from moving about said point in the opposite direction, for a purpose to be hereafter more fully set forth.

The upper extremity 55 of the dog 34 is adapted to project beyond the periphery of the indicator 38, and secured to the rear face of the latter in such a position as to engage the point or extremity 55 to trip said dog 34, is an arm or projection 56.

The front of the gear casing 21 is preferably provided with an elongated slot 57, extending therethrough, shown more clearly in Figs. 9 and 11, and located preferably adjacent the indicator 38. Movably mounted in this slot 57 is a suitable member 58, to which is pivotally supported by one end a pawl 59, the extremity 60 of which is adapted to engage and rest upon the peripheral teeth 44 of the indicator 38. When said pawl 59 is reciprocated through the medium of the member 58, the extremity 60 thereof will successively engage the peripheral teeth 44 of the indicator 38 to impart an intermittent movement to the indicator. Reciprocating movement is imparted to the member 58 through the medium of two cam-shaped projections 61—62, which extend beyond and are secured to the face of the gear 20. Said cam-shaped projections are adapted to successively engage a laterally projecting pin 63 on the member 58, shown more clearly in Figs. 2, 9 and 11, to respectively raise and lower the said member 58, as the gear 20 is operated.

The pawl 59 is preferably of the gravity type, and any suitable means may be provided for raising the extremity 60 thereof out of engagement with the peripheral teeth 44 of the indicator 38. A suitable and efficient means comprises a projecting lug 64, which passes through a suitable aperture 65, in the cover 45, and said lug 64 is preferably provided with an enlarged head 66, by means of which the operator may move the pawl 59 about its pivot to raise the extremity 60 of the pawl out of engagement with the teeth 44. The head 66 is preferably of a size to normally close the aperture 65 in the cover 45. The periphery of the indicator 38 is provided with a flattened portion 44$^b$ for a purpose to be set forth.

A retaining pawl 59$^a$ is pivoted by one end to the casing 21, and the free extremity 59$^b$ thereof is preferably provided with a plurality of spaced teeth 59$^c$ adapted to engage and rest upon the peripheral teeth 44 of the indicator dial 38 so that when the latter is advanced one step of rotation by the pawl 59, the teeth 59$^c$ will engage the teeth 44 to prevent retrograde movement of the dial.

A suitable stop 60$^a$ may be provided for limiting the movement of the pawl 59$^a$ which latter is preferably arranged in close proximity to the free end of the pawl 59 so that when the pawl 59 is released or raised by the stud 64 the free extremity of the pawl will engage and simultaneously raise the pawl 59$^a$ to release the dial 38. The pawl 59$^a$ is also arranged in such a position with relation to the pawl 59 that the operation of the latter through the medium of the pin 63 and the cam 61, will not affect or move the former.
The dog 34 is adapted to be tripped to stop the pump at any desired time, preferably by means of an operating bar 67, one end of which is pivotally connected to the latch or dog 34, and the other end is provided with an operating handle 68.

Briefly stated the operation of the above described parts, is as follows: Assuming the parts to be in position as shown in Fig. 1, the pump is in an inoperative position with the indicator at the zero point; that is, with the zero character indicating the normal position of the dial under the extremity 51 of the indicator point 50, as shown more clearly in Figs. 4 and 11 of the drawings. The operator first sets the dial to the quantity desired to be discharged by the pump, by rotating the indicator dial to the right or in a clockwise direction by means of the handle 40 until the figure designating the desired quantity appears under the extremity 51 of the pointer 50, the end 60 of the pawl 59 riding over the teeth 44. After the dial has thus been set, the rod 31 may be raised in the manner already described, until its extremity or deflected end 32 is engaged by the end 33 of the dog 34 to become locked. The raising of this rod permits such action of the clutch members 25 as to lock the driving pulley 22 to the shaft 23, so that motion will be transmitted to the shaft 23. The reciprocation of the pawl 59 will intermittently move the dial to the right and the teeth 44 are so disposed that the characters appearing under the extremity 51 during the operation of the pump will decrease, that is, assuming any one of the numbers to be under the end 51 and the indicator is moved one notch, the next figure appearing under the pointer or end 51 will be one denomination lower, and so on. This rotation of the indicator is continued until the latter has assumed a zero or normal position, that is, until the zero point appears under the extremity 51, at which time the extremity 60 of the pawl 59 will engage and rest upon the flattened portion 44$^b$ in the periphery of the indicator dial. As the indicator approaches the zero or normal position, the projection 56 will engage the extremity 55 of the dog 34 to trip the latter, permitting the rod 31 to return to its normal position under the influence of the flexible member 27 to release the clutch members 25.

Any suitable means may be provided for preventing the indicator from passing beyond the set point when returned by the spring 43. A suitable and efficient means for accomplishing this purpose, and to which this invention is more particularly directed, comprises an arm 69 which is pivotally supported by one extremity, preferably by means of a suitable aperture 70 through the extremity, and into which aperture projects a suitable shouldered portion 71 of the operating handle 40 of the indicator. This arm is mounted for free movement about the shouldered portion 71 and over the face of the indicator 38. The free extremity thereof is preferably spaced from the indicator and terminates adjacent its periphery in a casing 72 which is preferably provided with a slot 73 in the side thereof, and which opens through one end. Projecting from one side of the slot 73 toward the other side thereof, and remote from the extremities of the slot, is a projection 74 forming a suitable recess 75. A pin 76 projects through the casing 72, and is provided with an operating handle 77. This pin 76 is of a length to project entirely through the casing 72, so that the extremity 78 thereof will enter and be seated in any one of the apertures 46 of the indicator 38. A suitable yielding member 79 is preferably located within the casing 72, so that one end thereof will engage the top of the casing, and the other end will engage a laterally projecting stud 80 on the pin 76. Said yielding member 79 tends to normally hold the free extremity 78 of the pin 76 within one of the apertures. When the extremity 78 is seated in one of the apertures 46, the pin 76 may be axially rotated, so that the stud 80 will pass under the projection 74 to lock the pin against accidental displacement, and to cause the arm 69 to rotate with the indicator 38. When the pin 76 is withdrawn, so that the extremity 78 thereof will be unseated, it may be locked in its withdrawn position by axially rotating the same, so that the stud 80 will enter the recess 75 above the projection 74, and in such position that the arm 69 may be freely rotated about its point of pivotal support into a position that the extremity 78 of the pin, when the latter is released, will enter one of the desired apertures 46 adjacent the character designating the specific quantity desired to be discharged by the pump.

Assuming the parts to be in the position as shown more clearly in Figs. 3, 4 and 11 of the drawings, and that it is desired to set the dial to discharge a specific quantity (for example, we will say five gallons) the operation is as follows: The pin 78 being locked out of operative position, as shown more clearly in Fig. 3, the arm 69 is free to be moved in any desired direction. The operator may then turn the arm 69 until the pin 76 is opposite the aperture adjacent the numeral 5 as shown in Fig. 1 of the drawings. In this position, the pin 76 is rotated in its bearing to unlock the same, and the yielding member 79 will seat the extremity 78 thereof in the aperture adjacent the numeral 5. The indicator may then be rotated to the right or in a clockwise direction by means of the handle 40 until the numeral 5 assumes the zero position or the position occupied by the zero point, which operation tends to wind up or increase the tension of the spring 43. This rotation of the indicator will not be interrupted by the stops 48, 49, as the stop 49 which is carried by the indicator will be moved away from the stop 48. When the indicator is in this position, the portion of the pin 76 which is adjacent the face of the indicator, will rest against the extremity 51 of the pointer or index 50. When thus adjusted, the operating mechanism may be set into operation as in the manner already described, that is, by actuating the lever 35. The indicator is then intermittently rotated in a clockwise direction by means of the pawl 59, and the operating mechanism and the pump element will remain in operation until the zero point appears beneath the extremity 51 of the indicator pointer 50, at which point the dog 39 will be tripped in the manner already described, so that the pump element will not be operated. When the pump operating mechanism is tripped, it will be noted that the pin 76 has moved to a position 5 points beyond the indicator pointer 50. In order to reset the indicator so that the pump will discharge a similar quantity with the next operation of the pump, all that it is necessary is to raise the pawls 59, 59ᵃ out of engagement with the peripheral teeth 44 in the manner as already set forth. The normal tendency of the spring 43 is to return the indicator to the zero position, and during the advancement of the indicator, while discharging the first desired quantity, the tension of the spring 43 will be increased, and when the indicator is released, it will be noted that the spring 43 will have a tendency to turn the indicator in the opposite direction, and this return movement is checked by means of the pin 76 which engages the extremity 51 of the indicator 50; that is, the pin 76 coöperating with the extremity 51 of the indicator 50 will act as a stop for the return movement of the indicator. Thus it will be seen with this construction, improved means are provided for automatically setting or returning the indicator to the position to which it was set for the initial discharge of the pump, without necessitating a careful manipulation by the operator of the indicator to accurately adjust and set the same for discharging each subsequent amount of liquid. The indicator having been once set, the resetting operation for the subsequent quantities will be automatic.

Should it so happen that the quantities to be discharged will necessitate the setting of the pin to a position to the left-hand side of the pivot point of the indicator or pointer 51, such for instance, as 95 gallons, the pin 76 may be released in the manner already set forth, and instead of rotating the arm 69 completely about the face of the indicator, it may be moved to the left so that the pin 76 will clear the extremity 51 of the indicator or pointer and pass to the other side of the point of pivotal support 53, after which the indicator or pointer will assume its normal position as will be understood. The pawls 59, 59$^a$ may also be raised by the handle 66 to permit the indicator to be rotated to the left or in an anticlockwise direction by the handle 40 to position the indicator. Thus it will be seen that the arm 69 may be adjusted to any desired position regardless of its position with respect to the indicator or pointer 51, and that having been once adjusted, the indicator or pointer will act as a stop by means of which the indicator may be automatically set for subsequent quantities after having been once set for the initial quantities.

Again assuming the indicator 38 to be in the position shown in Figs. 4 and 11, and it is desired to discharge 95 gallons, all that it is necessary is to set the pin 76 in the opening in the indicator adjacent the 95 gallon indication, and then rotate the indicator in a clockwise direction until the pin 76 passes the indicator or pointer 51 which rotation will create a further tension on the spring 43 so that when the indicator is released, the tension of the spring will move the indicator in an anti-clockwise direction to cause the pin 76 to engage the indicator or pointer 51 and hold the indicator in its adjusted positions to indicate 95 gallons. The indicator is then intermittently operated in a clockwise direction as before described, which moves the 95 graduation away from the indicator or pointer in a clockwise direction, which will still further increase the tension of the spring 43. When now the zero graduation of the indicator assumes a position under the indicator or pointer 51, the projection 56 will rock the dog 34 and throw the operating mechanism out of operation. Obviously, the indicator may be rotated anti-clockwise when the pin 76 is locked or held in an inoperating position, by means of the knob or handle 40 after the knob or button 66 is shifted to render the pawls 59, 59$^a$ inactive with respect to the toothed periphery of the indicator 38 as indicated in dotted lines in Fig. 9.

When it is desired to discharge the full capacity, that is, the largest quantity possible, which in the present exemplification of the invention is 100 gallons, it is not necessary to employ the pin 76 and the latter is first locked in an inoperative position. The indicator is then released, and when thus released, the tension of the spring 43 will move the indicator to the left or anti-clockwise, which will cause the projection 49 on the indicator to engage the stop 48 on the opposite side and move the latter to the left, and said stop will move a sufficient distance to check the movement of the indicator when the 100 graduation mark appears below the end of the indicator or pointer 50. When the indicator is set in this position, the extremity 60 of the pawl 59 will engage the tooth 44 just behind the flattened portion 44$^a$, and the extremities 59$^c$ of the pawl 59$^a$, will engage the teeth 44 on the other side of the space 44$^b$ so that the first movement of the pawl 59 will move the indicator one step of rotation (see Fig. 9). The extremities 59$^c$ of the pawl 59$^a$ are so spaced that they will completely fill the space adjacent the flattened portion 44$^b$ as it comes adjacent the extremities, so as to insure a positive and regular motion to the indicator; one of the extremities engaging the tooth on the farther side of the space to hold the indicator, while the other extremity is adjacent the flat portion, and the said other extremity will engage the tooth on the other side of the space while the first extremity is adjacent the flattened portion.

When the indicator reaches the zero position or the position shown in Fig. 11, the extremity 60 of the pawl 59 will engage the flattened portion 44$^b$ to prevent further rotation of the indicator. During the rotation to the zero position, the stop 49 will engage the stop 48 on the other side, as shown in Fig. 12 to move the latter stop to permit the indicator to assume a proper position. When released, the spring 43 will return the indicator to the position to pump 100 gallons.

In order that the invention might be fully understood by those skilled in the art, the details of the foregoing embodiment thereof have been thus specifically described, but

What I claim as new and desire to secure by Letters Patent is:

1. In an indicator for self-measuring pumps, means for adjusting the indicator, mechanism for moving the indicator from its adjusted position and in the plane of its adjustment, means operatively related to the indicator for rendering the said mechanism inactive, and means for returning the indicator to its adjusted position.

2. In an indicator for self-measuring pumps, means for adjusting the indicator, mechanism for moving the indicator from its adjusted position and in the plane of its adjustment, means for rendering the said mechanism inactive, and means for automatically returning the indicator to its adjusted position.

3. In an indicator for self-measuring pumps, means for adjusting the indicator, mechanism for imparting a step by step movement to the indicator to move the latter from its adjusted position and in the plane of its adjustment, means for rendering the operating mechanism inactive, and means for automatically returning the indicator to its original adjusted position.

4. In an indicator for self-measuring pumps, means for adjusting the indicator, mechanism for imparting a step by step movement to the indicator to move the latter from its adjusted position and in the plane of its adjustment, means operatively related to the indicator for automatically rendering the said operating mechanism inactive, and means for automatically returning the indicator to its original adjusted position.

5. In an indicator for self-measuring pumps, means for adjusting the indicator, mechanism for moving the indicator from its adjusted position and in the plane of its adjustment, mechanism for rendering the first said means inactive, means for returning the indicator to its original adjusted position, and means for limiting the last said movement of the indicator.

6. In an indicator for self-measuring pumps, means for adjusting the indicator, mechanism for moving the indicator from its adjusted position and in the plane of its adjustment, means for rendering the said operating mechanism inactive, means for returning the indicator to its original adjusted position, and a stop for limiting the last said movement of the indicator.

7. In an indicator for self-measuring pumps, means for adjusting the indicator, mechanism for moving the indicator from its adjusted position and in the plane of its adjustment, means for rendering the said operating mechanism inactive, means for returning the indicator to its original adjusted position, and an adjustable stop on the indicator for limiting the last said movement of the indicator.

8. In an indicator for self-measuring pumps, means for adjusting the indicator, mechanism for moving the indicator from its adjusted position and in the plane of its adjustment, means for rendering the said operating mechanism inactive, means for returning the indicator to its original adjusted position, a stop operatively related to the indicator, and an index coöperating with the indicator, said stop being adapted to engage the index to limit the last said movement of the indicator.

9. In an indicator for self-measuring pumps, means for adjusting the indicator, mechanism for moving the indicator from its adjusted position and in the plane of its adjustment, an index coöperating with the indicator, means for rendering the said operating mechanism inactive, means for returning the indicator to its original adjusted position, and a stop adjustably secured to the indicator and adapted to engage the index to limit the last said movement of the indicator.

10. In an indicator for self-measuring pumps, means for adjusting the indicator, mechanism for intermittently moving the indicator from its adjusted position and in the plane of its adjustment, means for rendering the said mechanism inactive, an index coöperating with the indicator, means for automatically returning the indicator to its original adjusted position, a stop adjustable with relation to the indicator, and means for securing the stop to the indicator, said stop being adapted to engage the index to limit the last said movement of the indicator.

11. In an indicator for self-measuring pumps, means for adjusting the indicator, mechanism for moving the indicator, mechanism for moving the indicator from its adjusted position, an index coöperating with the indicator, means for releasing the operating mechanism, means for returning the indicator to the original adjusted position, a stop adjustable with relation to the indicator, and means for securing the stop in its adjusted position, said stop being adapted to coöperate with the index to limit the return movement of the indicator, and said stop being also adapted to permit free movement of the stop in the opposite direction.

12. In an indicator for self-measuring pumps, means for adjusting the indicator, mechanism for moving the indicator from its adjusted position, a yielding index coöperating with the indicator, means for releasing the operating mechanism, means for returning the indicator to its orignal adjusted position, a stop adjustable with relation to the indicator, means for securing the stop to the indicator in its respective adjusted position, said index being adapted to permit the free movement of the indicator in one direction, and means whereby the index will limit the movement of the indicator in the opposite direction when engaged by the stop.

13. In an indicator for self-measuring pumps, means for adjusting the indicator, mechanism for moving the indicator from its adjusted position and in the plane of its adjustment, a stop supported for independent movement, said stop being adjustable with relation to the indicator, means for securing the stop to the indicator for movement therewith, means for returning the indicator to its original adjusted position, and means adapted to be engaged by the stop to limit the last said movement of the indicator.

14. In a rotatable indicator for self-measuring pumps, means for adjusting the indicator, mechanism for moving the indicator from its adjusted position, a stop mounted for movement independent of the indicator, means operatively related to the stop for securing the latter to rotate with the indicator, a yielding index coöperating with the indicator, said index being adapted to permit a free movement of the stop in one direction and to limit the movement thereof in the opposite direction, and means for automatically returning the indicator to its original adjusted position.

15. In an indicator for self-measuring pumps provided with a plurality of apertures, means for adjusting the indicator, mechanism for moving the indicator from its adjusted position and in the plane of its adjustment, a stop mounted for movement independent of the indicator, a member adjustably supported by the stop, the extremity of said member being adapted to enter one of the apertures to secure the stop for rotation with the indicator, means for returning the indicator to its original adjusted position, and means coöperating with the stop to limit the last said movement of the indicator.

16. In an indicator for self-measuring pumps, provided with a plurality of apertures, means for adjusting the indicator, mechanism for moving the indicator from its adjusted position, a stop mounted for movement independent of the indicator, a member adjustably supported by the stop, the extremity of said member being adapted to enter one of the apertures to secure the stop for rotation with the indicator, means for locking the member in engagement with the indicator, means for returning the indicator to its original adjusted position, and means coöperating with the stop to limit the last said movement of the indicator.

17. In an indicator for self-measuring pumps provided with a plurality of apertures, means for adjusting the indicator, mechanism for moving the indicator from its adjusted position, a member mounted for movement independent of the indicator, a pin adjustably supported by the member, means for holding the pin out of engagement with the indicator, one extremity of the pin being adapted to enter one of the apertures to secure the member for rotation with the indicator, means for locking the pin in engagement with the indicator, means for returning the indicator to its original adjusted position, and means coöperating with the member to limit the last said movement of the indicator.

18. In an indicator for self-measuring pumps provided with a plurality of apertures, means for adjusting the indicator, mechanism for imparting a step by step movement to the indicator to move the same from its adjusted position, a member mounted for movement independent of the indicator, a spring-controlled pin adjustably supported by the member, means for locking the pin out of engagement with the indicator, one extremity of the pin being adapted to enter one of the apertures to secure the member for rotation with the indicator, means for locking the pin in engagement with the indicator, means for releasing the indicator, means for returning the indicator to its original adjusted position when released, and means coöperating with the said member for limiting the last said movement of the indicator.

19. In an indicator for self-measuring pumps adapted to normally assume a zero position, means for adjusting the indicator from said position, mechanism for moving the indicator from its adjusted position toward the zero position and in the plane of its adjustment, means for preventing the movement of the indicator beyond the said zero position, means for causing the indicator to assume a zero position, said means also serving to return the indicator to its original adjusted position, and means for limiting the last said movement of the indicator.

20. In a rotatable indicator for self-measuring pumps, a yielding member normally tending to cause the indicator to assume a zero position, means for adjusting the indicator, means for moving the indicator from its adjusted toward the zero position against the tension of the yielding member and in the plane of its adjustment, means for releasing the indicator whereby the yielding member will return the indicator to its original adjusted position, and means for limiting the last said movement of the indicator.

21. In a rotatable indicator for self-measuring pumps, a yielding member normally tending to cause the indicator to assume a zero position, means for preventing the passage of the indicator beyond said zero position, means for adjusting the indicator, means for moving the indicator from its adjusted toward the zero position against the tension of the yielding member and in the plane of its adjustment, means for releasing the indicator whereby the yielding member will return the indicator to its original adjusted position, and means for limiting the last said movement of the indicator.

22. In a rotatable indicator for self-measuring pumps, a yielding member normally tending to cause the indicator to assume a zero position, means for adjusting the indicator, means for moving the indicator from its adjusted to its zero position against the tension of the yielding means, means for retaining the same in the last said position, means for releasing the indicator whereby the yielding member will return the indicator to its original adjusted position, and separate means for limiting both of the movements of the indicator.

23. A rotatable indicator for self-measuring pumps, provided with indicating characters thereon, means tending normally to maintain the indicator in a zero position, means for adjusting the indicator to a predetermined position, means for maintaining the indicator in its adjusted position, means for moving the indicator from its adjusted to its zero position against the tension of the first said means, means for preventing the movement of the indicator beyond the zero position, and means for releasing the indicator to permit the first said means to return the indicator to its original adjusted position.

24. A rotatable indicator for self-measuring pumps, provided with indicating characters thereon, means tending normally to maintain the indicator in a zero position, means for adjusting the indicator to a predetermined position, means for maintaining the indicator in its adjusted position, means for intermittently moving the indicator from its adjusted to its zero position against the tension of the first said means, means for preventing the movement of the indicator beyond the zero position, and means for releasing the indicator to permit the first said means to return the indicator to its original adjusted position.

25. In combination, a pump element, a support therefor, a rotary indicator mounted thereon, inter-engaging means on said indicator and support adapted to limit the movement of the indicator in both directions, one of said means being yielding with relation to its respective support, and means for moving the indicator in both directions.

26. In combination, a pump element, a support therefor, a rotary indicator mounted thereon, inter-engaging means on said indicator and support adapted to limit the movement of the indicator in both directions, one of said means being yielding with relation to its respective support, positive means for moving the indicator in one direction and out of operative position, and means for automatically moving the indicator in the opposite direction and into an operative position.

27. In combination, a pump element, a support therefor, a rotary indicator provided with characters progressing successively from zero, a projection on the indicator, a movable stop on the support, means for causing the indicator to normally assume a zero position, said projection being adapted to engage and move the stop to permit the indicator to assume said zero position, said indicator being adapted to be adjusted from its zero position to cause the projection to engage and move the stop in the opposite direction to permit the indicator to assume a predetermined position, means for retaining the indicator in its adjusted position, means for returning the dial from its adjusted to its zero position, and means for returning the dial to its original adjusted position.

28. In combination, a pump element, a support therefor, a rotary indicator provided with characters progressing successively from zero, a projection on the indicator, a movable stop on the support, means for causing the indicator to normally assume a zero position, said projection being adapted to engage and move the stop to permit the indicator to assume said zero position, said indicator being adapted to be adjusted from its zero position to cause the projection to engage and move the stop in the opposite direction to permit the indicator to assume a predetermined position, means for retaining the indicator in its adjusted position, means for intermittently returning the dial from its adjusted to its zero position, and means for returning the dial to its original adjusted position.

29. In combination, a pump element, a support therefor, a rotary indicator provided with characters progressing successively from zero, a projection on the indicator, a movable stop on the support, means for causing the indicator to normally assume a zero position, said projection being adapted to engage and move the stop to permit the indicator to assume said zero position, said indicator being adapted to be adjusted from its zero position to cause the projection to engage and move the stop in the opposite direction to permit the indicator to assume a predetermined position, positive means for moving the indicator from said adjusted position to the zero position, means for retaining the indicator in the last said position, means for releasing the indicator, and means for automatically retaining the indicator to its adjusted position when released.

30. The combination of an indicator embodying coöperating elements capable of relative adjustment, fastening means for fastening the elements together for simultaneous movement and for unfastening them, motion imparting means for moving the indicator from its adjusted position and embodying clutch mechanism, and means whereby the movement of the indicator by the motion imparting means will render the clutch inactive to disconnect the motion imparting means and the indicator.

31. The combination of an indicator embodying coöperating elements capable of relative adjustment, fastening means for fastening the elements together for simultaneous movement and for unfastening them, motion imparting means for moving the indicator from its adjusted position and embodying clutch mechanism, and means connected with one of the said elements for controlling the clutch mechanism whereby the movement of the indicator by the motion imparting means will render the clutch inactive to disconnect the motion imparting means and the indicator.

32. The combination of an indicator embodying coöperating elements capable of relative adjustment, fastening means for fastening the elements together for simultaneous movement and for unfastening them, and motion imparting means connected with one of the said elements for moving the indicator from its adjusted position, said motion imparting means embodying clutch mechanism, there being a projection connected to and movable with one of the said elements and operating as a trip to render the clutch mechanism inactive.

33. The combination of an indicator embodying coöperating elements capable of relative adjustment, fastening means for fastening the elements together for simultaneous movement and for unfastening them, and motion imparting means connected with one of the said elements for moving the indicator from its adjusted position, said motion imparting means embodying clutch mechanism, there being a projection connected with one of the said elements adapted to be adjusted therewith and also moved with the indicator, said projection operating as a trip to render the clutch mechanism inactive at a predetermined point in the movement of the indicator.

In testimony whereof I have signed my name to this specification, in the presence of two subscribing witnesses, on this 27th day of March, A. D. 1907.

ALLEN A. BOWSER.

Witnesses:
S. B. BECHTEL,
H. M. BOWSER.